(12) United States Patent
Payne et al.

(10) Patent No.: US 7,003,327 B1
(45) Date of Patent: Feb. 21, 2006

(54) HEURISTICALLY ASSISTED USER INTERFACE FOR A WIRELESS COMMUNICATION DEVICE

(75) Inventors: Craig William Payne, Park City, UT (US); Paul A. Smethers, Cupertino, CA (US)

(73) Assignee: Openwave Systems Inc., Redwood City, CA (US)

( * ) Notice: Subject to any disclaimer, the term of this patent is extended or adjusted under 35 U.S.C. 154(b) by 555 days.

(21) Appl. No.: 09/594,302

(22) Filed: Jun. 14, 2000

Related U.S. Application Data

(60) Provisional application No. 60/145,467, filed on Jul. 23, 1999.

(51) Int. Cl.
*H04B 1/38* (2006.01)

(52) U.S. Cl. ............... 455/566; 455/226.4; 455/575.1; 455/412.2; 455/405; 455/11.1; 455/403; 455/67.7; 340/7.56; 340/3.55; 340/7.53; 340/7.48; 340/7.2; 379/88.11; 379/88.15; 379/88.14

(58) Field of Classification Search ............... 455/67.7, 455/226.4, 566, 575, 412, 405, 11.1, 403, 455/575.1, 412.2; 707/4; 340/7.56, 3.55, 340/7.53, 7.48, 7.2; 379/88.11, 88.15, 88.14; 701/209; 454/405

See application file for complete search history.

(56) References Cited

U.S. PATENT DOCUMENTS

| | | | | |
|---|---|---|---|---|
| 5,705,995 A | * | 1/1998 | Laflin et al. ............... | 340/7.48 |
| 5,983,073 A | * | 11/1999 | Ditzik ....................... | 455/11.1 |
| 6,282,491 B1 | * | 8/2001 | Bochmann et al. ......... | 701/209 |
| 6,301,471 B1 | * | 10/2001 | Dahm et al. ................ | 455/405 |
| 6,351,523 B1 | * | 2/2002 | Detlef ..................... | 379/88.14 |
| 6,401,085 B1 | * | 6/2002 | Gershman et al. ............. | 707/4 |
| 6,430,405 B1 | * | 8/2002 | Jambhekar et al. ......... | 455/403 |
| 6,456,841 B1 | * | 9/2002 | Tomimori ................... | 455/412 |
| 6,466,782 B1 | * | 10/2002 | Ishikawa et al. ............ | 455/412 |

* cited by examiner

*Primary Examiner*—Joseph Feild
*Assistant Examiner*—David Q. Nguyen
(74) *Attorney, Agent, or Firm*—Blakely, Sokoloff, Taylor & Zafman LLP

(57) ABSTRACT

A method and apparatus for implementing a heuristic user interface for a mobile device that assists a user with the management and utilization of contact identifiers (e.g. phone numbers, facsimile numbers, email addresses and uniform resource identifiers (URIs)). Content stored on or being processed by a mobile device is analyzed for the presence of predetermined classes of contact identifiers. When a contact identifier belonging to one of the predetermined classes is encountered, it is presented to the user of the mobile device on the display screen and the user interface of the mobile device is provisioned (e.g., softkey assignments and screen displays) for the particular class of contact identifier encountered. The encountered contact identifiers may be used as direct contact identifiers or indirect contact identifiers. Direct contact identifiers are used to initialize the appropriate application for the class of identifier encountered (e.g. an email application for an email contact identifier) and establish contact with an associated entity (e.g. an email addressee). Indirect contact identifiers are used to retrieve locally and remotely held records containing the encountered contact identifiers.

44 Claims, 11 Drawing Sheets

HEURISTICALLY ASSISTED USER INTERFACE FOR A WIRELESS COMMUNICATION DEVICE

CLAIM OF BENEFIT TO PROVISIONAL APPLICATION

This application claims the benefit of the earlier-field U.S. Provisional Patent Application No. 60/145,467 filed Jul. 23, 1999.

BACKGROUND OF THE INVENTION

1. Field of the Invention

The present invention relates to wireless communication systems and devices and, more particularly, to a heuristically assisted user interface for a wireless communication device for use in conjunction with a wireless communication system having access to distributed network resources.

2. Description of the Related Art

There are already several hundred million subscribers to wireless communication services throughout the world. With this proliferation of wireless communications, it is becoming more likely that parties will interact with one another in instances where the only means of communication for one or both parties is through wireless communication systems. Wireless communication refers to the situation in which at least one party is making use of a portable, wireless two-way interactive communication device and a wireless network. Portable, wireless two-way interactive communication devices can, for example, include personal digital assistants (PDAs), two-way pagers, palm-sized computers, and mobile phones.

As the number of subscribers to wireless communication systems has increased, so have the number of services available to those subscribers. Email services, short message services, facsimile services, and voice mail services are among a few of the services which are available to the users of these devices in addition to standard phone service. Subscribers having a plurality of these services will also have a plurality of unique identifiers associated with the services. It is not uncommon for a subscriber to have a home phone number, a work phone number, a facsimile number, a home page URL and one or more email addresses in addition to the unique identifiers associated with their wireless services. All of these services and their associated identifiers provide the subscribing public with flexibility in terms of how they communicate with each other.

For those individuals that are of particular interest to a subscriber, a record (e.g. a contact list) may be kept as to the various ways to make contact. This record may be kept electronically (e.g. an address book on a computerized device) or non-electronically (e.g. personal organizers). For some organizations and groups, records of this type form the basis for their internal and external communications.

When a subscriber receives a message from another individual, the information required to contact that individual with a response may be contained within the received message. This information may comprise one or more direct contact identifiers (e.g. a phone number, an email address or a uniform resource identifier (URI)) and/or one or more indirect contact identifiers (e.g. the name of a person or a public place) that may be used to lookup a direct contact identifier in an accessible resource (e.g. the phone book).

The task of processing all this information falls to the users of these wireless communication devices. There are limitations associated with these wireless communication devices that make this task even more difficult. Specifically, the user interfaces and display screens associated with the wireless communications devices are not as user friendly as the input and viewing interfaces associated with personal computers. The processing power and storage capabilities are not comparable to their personal computer counterparts. Additionally, the users of these wireless communication devices may be performing other tasks (e.g. driving) that may limit their attention and/or ability to interact with the wireless communication device.

Traditional wireless communication devices, which support the types of services described above, generally require the user to place the wireless communication device into the appropriate mode of operation prior to inputting and utilizing contact information. In addition to changing the device's mode of operation, the user may be required to place the subject contact information into a particular field.

Wireless communication devices are currently and will continue to be mass-market electronic devices, and as such their success depends upon gaining acceptance among large segments of the population. Three of the most important factors, which will contribute to this success, are: 1) the price of the device, 2) the device features and 3) the user friendliness of the device. The processing power and storage capacity of wireless communication devices is largely limited by the pricing constraints associated with devices of this type. These factors have considerable influence on the success or failure of these types of devices. The user friendliness (i.e. ease of use) of a wireless communication device is one of the most important features considered by consumers when making a purchase decision regarding such devices. More specifically, the wireless communication device should be easy to use in the environment and under the conditions in which consumers find themselves desiring to use the device.

To improve the user friendliness of wireless communication, the device manufacturers and associated software developers have incorporated software which adds features such as automatic number identification and recognition of uniform resource indicators (URIs) present in text. These methods have generally been focused on dealing with a single type of identifier (e.g. a phone number or a URI) and may require the user to highlight an identifier of interest prior to utilization.

In view of the foregoing, it would be desirable to have an apparatus and/or method that could enhance a subscriber's ability to utilize and manage contact identifier information in conjunction with the use of a wireless communication device.

SUMMARY OF THE INVENTION

The present invention is directed to a method and apparatus for implementing a heuristic user interface for a wireless communications device (also referred to as a mobile device herein) that assists the user with the management and utilization of contact identifiers (e.g. phone numbers, facsimile numbers, email addresses and uniform resource identifiers (URIs)). The content and headers of information that is stored on or being processed by a mobile device are automatically analyzed for the presence of predetermined classes of contact identifiers. Contact identifiers belonging to the predetermined classes are automatically identified and selected for possible use by the inventive process. Once identified and selected for possible use, the user may be provided with information describing the function of the encountered contact identifiers and may use these identifiers as direct contact identifiers (i.e. the identifiers may be used to directly initiate contact with the device/individual associated with the contact identifier) or as indirect contact identifier (i.e. the identifiers may be used to retrieve data and or files from local and remote storage devices). Contact identifiers, belonging to the predetermined classes, may also be highlighted (e.g. bold text, reverse video, offset and magnification) in some applications of the present invention.

Furthermore, the invention can be implemented in numerous ways, including as a method, an apparatus or device, a user interface, a computer readable medium, and a system. Several embodiments of the invention are discussed below.

As a mobile device, one embodiment of the invention includes a display screen, a user interface, and computer program code for causing the mobile device to (i) automatically identify and select for possible use predetermined classes of contact identifiers contained within the content and/or headers stored on or being processed by a mobile device, and (ii) provision the user interface of the mobile device for functions related to the use of encountered contact identifiers. A processor operatively connected to the display screen, and the user interface operates to execute the program code described above. One of the functions, which may be associated with the selected contact identifier, is the retrieval of locally and/or remotely held information records containing the encountered contact identifiers.

As a method for operating a mobile device having a display screen and a user interface, one embodiment of the invention includes the operations of automatically selecting contact identifiers contained within the content and/or headers stored on or being processed by a mobile device, where the selected contacted identifiers belong to one or more predetermined classes of contact identifiers and provisioning the user interface and display screen to perform functions and display information in accordance with the selected contact identifier. The screen display presentation produced as a result of this method may also include representations of the selected contact identifier that cause the selected contact identifier to stand-out on the display screen of the mobile device.

As a computer readable medium including computer program code for operating a mobile device having a display screen and a user interface, one embodiment of the invention includes: computer program code for automatically identifying contact identifiers belonging to predetermined classes contained within the content and/or headers stored on or being processed by a mobile device and provisioning the user interface and display screen to perform functions and display information in accordance with the type of contact identifiers encountered. As part of the provisioning of the display screen, symbolic identifiers associated with the function of the encountered contact identifiers may be provided and displayed.

The advantages of the present invention are numerous. Different embodiments or implementations may yield one or more of the following advantages. One advantage of the invention is that users of mobile devices can automatically select, utilize, and manage predetermined classes of contact identifiers contained in information stored in and/or being processed by their mobile devices. Another advantage of the invention is that users of mobile devices are able to have the user interfaces and display screens of their mobile devices provisioned for interacting with selected contact identifiers. Still another potential advantage of the invention is that the selected contact identifiers can be used to retrieve information files containing the selected contact identifiers from local and remote sources. Yet another advantage of the invention is that the selected contact identifiers can be used to establish contact records (e.g. address book entries) for later use by a user of the mobile device.

Other aspects and advantages of the invention will become apparent from the following detailed description taken in conjunction with the accompanying drawings, which illustrate, by way of example, the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The present invention is directed to a method and apparatus for implementing a heuristic user interface for a mobile device that assists a user with the management and utilization of contact identifiers (e.g. phone numbers, facsimile numbers, email addresses and uniform resource identifiers (URIs)). Content stored on or being processed by a mobile device is analyzed for the presence of predetermined classes of contact identifiers. When a contact identifier belonging to one of the predetermined classes is encountered, it is identified and the user interface of the subject mobile device is provisioned (e.g. softkey functions and screen displays) for the possible use of the particular class of contact identifier encountered. The encountered contact identifiers may be used as direct contact identifiers or indirect contact identifiers. Direct contact identifiers are used to initialize the appropriate application for the class of identifier encountered (if required) and establish contact with an entity associated with an encountered contact identifier (e.g. an email addressee). Indirect contact identifiers are used to retrieve locally and remotely held records containing the encountered contact identifiers. For example, if the mobile device has an address book entry containing an encountered identifier, then that address book record can be retrieved and displayed on the mobile device.

Mobile devices include, but are not limited to personal digital assistants (PDA) portable devices, cellular phones, palm-sized computing devices, and wireless capable remote controllers. It is not unusual for such devices to have less than 1% of the computing resources found in a personal computer. These mobile devices may have small display screens and limited user interface mechanisms (e.g., a phone keypad) for user interactions with server devices and wireless networks providing mobile subscriber services. These characteristics are useful in achieving the desired size, weight, power and mobility features that have proven to be important factors for mass-market mobile devices.

Embodiments of the invention are discussed below with reference to FIGS. 1–5. However, those skilled in the art will readily appreciate that the detailed description given herein with respect to these figures is for explanatory purposes as the invention extends beyond these limited embodiments.

Figure 1:
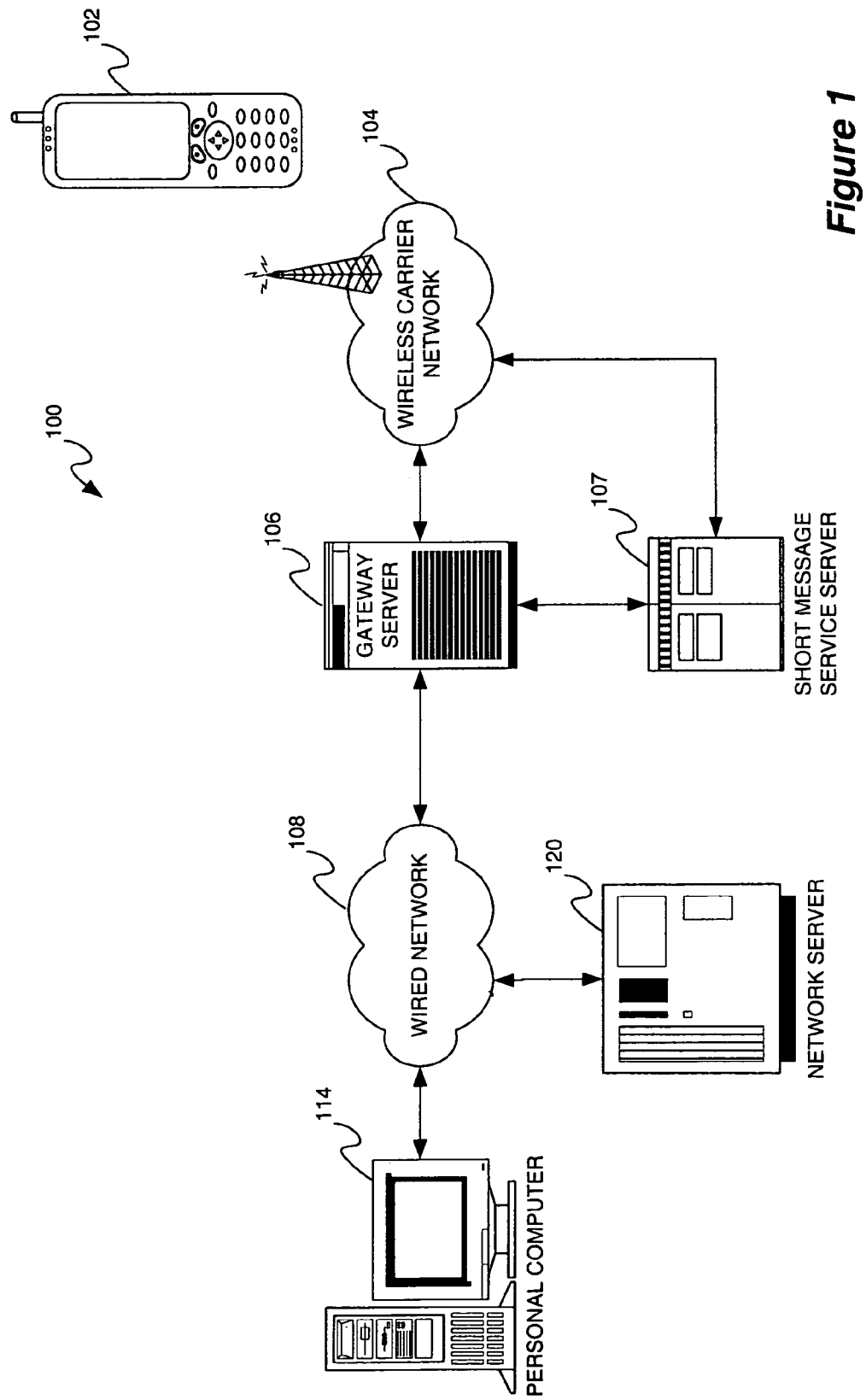
FIG. 1 is a block diagram of a wireless communication system that may be used to implement the method of the present invention.

FIG. 1 is a block diagram of a wireless communication system 100 that may be used to implement the method of the present invention. The wireless communication system 100 includes a plurality of mobile devices, which are represented by mobile device 102. Mobile device 102 is supported by a wireless carrier network 104 that provides for voice and data communication services. The wireless carrier network 104 couples to a wired network 108 through a gateway server 106. The wired network 108 is, for example, the Internet, a local area network (LAN), or a wide area network (WAN). The wireless carrier network 104 can be any of a variety of types of wireless networks, for example, Cellular Digital Packet Data (CDPD), Global System for Mobile Communications (GSM), Code Division Multiple Access (CDMA), Personal Handy Phone System (PHS) and Time Division Multiple Access (TDMA) networks, to name a few. Additionally, there may be a Short Message Service (SMS) server, which provides narrowband message services to mobile device 102.

Gateway server 106 can also be referred to as a proxy server for mobile device 102, which is serviced by wireless carrier network 104. Since the communication protocol used in wireless carrier network 104 is often different from that used in the wired network 108, one of the functions of the gateway server 106 is to translate from one communication protocol to another. Through gateway server 106, mobile device 102 has access to resources resident on a network server 120, which is coupled to the wired network 108, and to user specific storage areas resident on the gateway server 106 itself. The user specific storage areas resident on gateway server 106 may be accessed and managed using the user interface of mobile device 102 or through a user interface associated with a personal computer 114, which is also coupled to communicate through the wired network 108. One of ordinary skill in the art would understand that the functions of gateway server 106 may be performed by a network server device which includes or is capable of including a connection mechanism between wireless carrier network 104 and wired network 108.

The communication protocol used by the wired network 108 may be HyperText Transfer Protocol (HTTP) or Secure HyperText Transfer Protocol (HTTPS), a secure version of HTTP, and runs on Transmission Control Protocol (TCP). The communication protocol between wireless communication device 102 and gateway server 106 via the wireless carrier network 104 may be Handheld Device Transport Protocol (HDTP) (formerly known as Secure Uplink Gateway Protocol (SUGP)) or Wireless Access Protocol (WAP), for example.

Through the communication system described in FIG. 1, mobile device 102 has access to a plurality of incoming and outgoing communications services. Examples of these services include phone, facsimile, email, SMS, address book and network access services. Associated with each of the services is a characteristic contact identifier such as a phone number, a name, a uniform resource indicator (URI), a zip code, or an address. It is not uncommon for a single message (e.g. an email message) to contain a plurality of these contact identifiers and it is not unusual for an individual using mobile device 102 to receive a message via one service (e.g. a phone call) and transmit a response using another service (e.g. an email). Additionally, the user of mobile device 102 may be required to launch an application (e.g. an email application or a browser) prior to responding to a communication using a particular contact identifier.

Adding to the difficulty of this process are factors relating to the limited user interfaces and display screens generally associated with devices of this type. The user interface may be comprised of a phone styled keypad that may not be conducive to the efficient entry of large text strings (e.g. uniform resource indicators (URIs)). The display screens are generally small and may only display a fraction of the information in a page-sized message.

According embodiments of the present invention, content stored on or being processed by mobile device 102 is analyzed for the presence of predetermined classes of contact identifiers. When contact identifiers belonging to the predetermined classes are encountered during this process, the contact identifiers are selected for possible use by the user of mobile device 102. The user can then make a decision as to whether the contact identifier has been appropriately categorized and may utilize the contact identifier to perform the task indicated by its classification or to perform a user-specified task. For example a phone number can be used to place a phone call (i.e. a class task) or it can be used to retrieve an address book entry containing that phone number (i.e. a user-specified task). The content being analyzed may include the headers associated with the content as well as the message content. Additionally, the analysis may be conducted sequentially (i.e. all components of the headers and content are analyzed in order) or the process may be optimized for speed (i.e. only certain fields are analyzed).

For purposes of the described embodiments of the invention, the predetermined classes of contact identifiers nay be classified into two general categories: 1) user-specified (also referred to as local) and 2) class-specified (e.g. email addresses, phone numbers and URIs). The user-specified category matches strings against strings contained in files stored on mobile device 102 and/or in user specified storage areas resident on proxy server 106 or on a remote server device (e.g. network server 120). The user-specified categories may also be associated with local and remote applications (e.g. private and/or public phone book applications). The class-specified category utilizes contact identifier templates to functionally classify strings (i.e. abc@dot.com) resident within the analyzed content.

The following example is for purposes of illustrating the operation of the invention and not intended to limit its scope. If a user receives an email message containing an 11-digit numeric string preceded by the alpha-string "facsimile" then the 11-digit numeric string would be classified as a facsimile number which is a class-specified contact identifier. The string could then be used to initialize a local facsimile application and send a facsimile message. The same 11-digit string could also be classified in a similar fashion using a user-specified classification. If a match to the 11-digit string were found in an address book for a given record then it could be used to retrieve that record, where the record might contain other contact identifiers which could be used in a similar fashion.

Figure 2A:
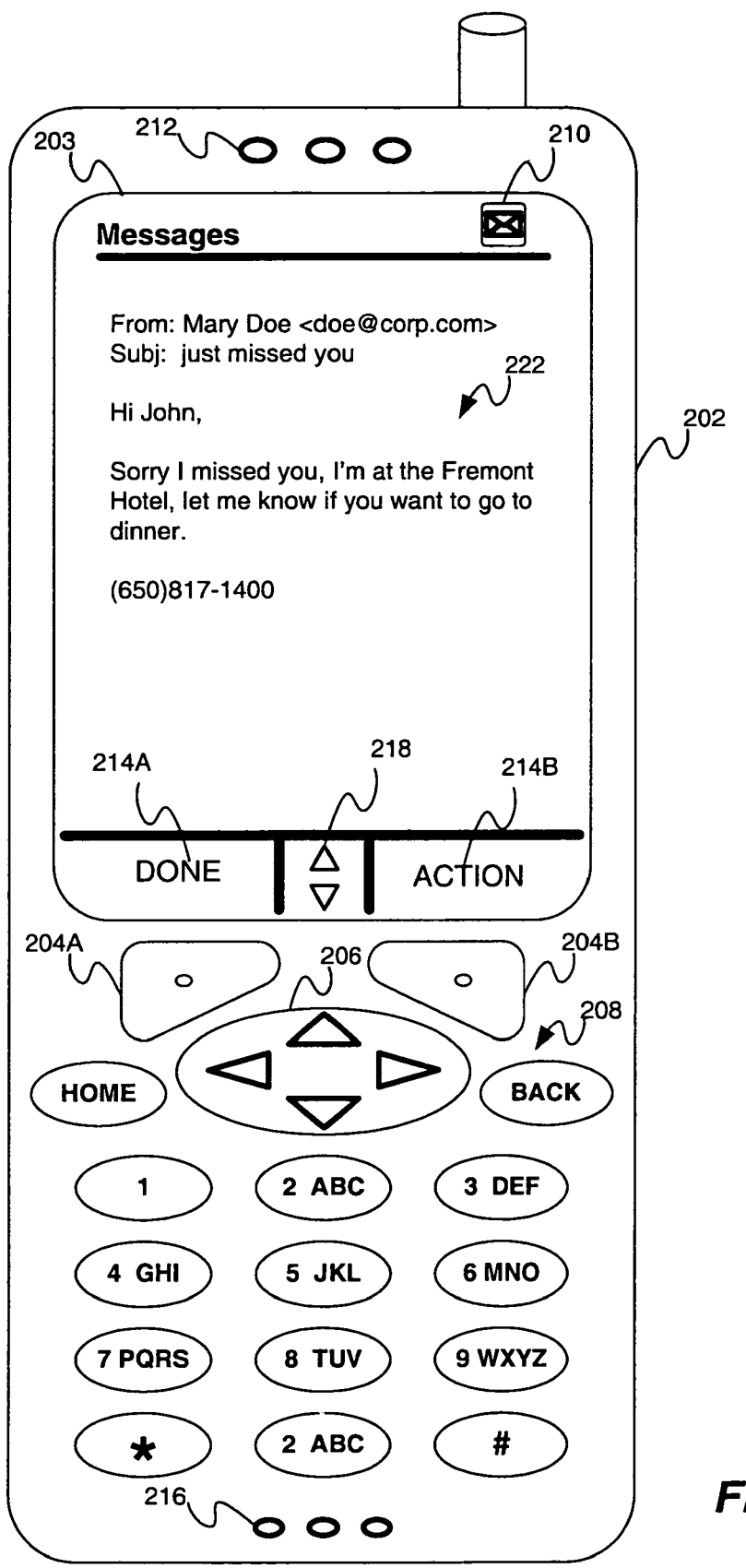
FIGS. 2A–2G are illustrations of a mobile device showing several illustrative display screens and which may be used in conjunction with the wireless communication system described in FIG. 1 to implement the method of the present invention.

FIG. 2A is a diagram of a mobile device 202, which may be mobile device 102 of FIG. 1. Mobile device 202 has a keypad 208, softkeys 204A and 204B and a navigation rocker 206, and has a display screen 203, which provides associated softkey identifiers 214A and 214B, a symbolic indicator 210 and a scroll indicator 218, that allows a user thereof to interact with mobile device 202. Additionally, the mobile device 202 includes a speaker 212 and a microphone 216 as may be found in conventional mobile telephones.

Keypad 208 may be a typical phone keypad having various control buttons, such as generic buttons and navigation (e.g., upward and downward arrow) buttons. The typical phone keypad includes twelve buttons, of which ten buttons are consecutively numbered 0 to 9, one button is for the "*" sign, and another button is for the "#" sign. Although not necessary for practicing the invention, the keypad 208 provides convenient and customary means for a user to interact with mobile device 202. Those having ordinary skill in the art would understand, that having a phone keypad is not a requirement to practice the present invention. Some mobile devices sometimes have no physical keys at all, such as those palm-sized computing devices that use soft keys or icons as an input mechanism.

For purposes of illustration, a screen display message 222 is shown on display screen 203. Screen display message 222 contains two name contact identifiers <Mary Doe> and <Fremont Hotel>, an email contact identifier <doe@corp.com>, and a phone number identifier <650-817-1400>. The headers associated with screen display message 222 may also contain contact identifiers that are not visible to the user of mobile device 202.

In accordance with the principles of the present invention, a user of a mobile device (e.g. mobile device 202) may initiate automatic contact identifier analysis by pressing a predetermined key (e.g. soft key 204B) or the analysis may be initiated without user intervention upon the occurrence of a predetermined event (e.g. the reception or designation of an email message). It is important to note at this point that the contents of a message of interest may be analyzed for contact identifiers without having to display the message. For example, analysis may be initiated by simply pointing to the storage location of a message of interest. This analysis is performed under program control of software stored on mobile device 202. The analysis process is based on pre-stored class templates, rules for string identification, and determines matches to pre-stored strings. Character and symbolic strings associated with messages are scanned for the presence of strings matching these criteria. Additionally, the process takes into account string information that has preceded the string being identified. For example, an 11-digit number could be a phone number, a facsimile number, or a pager number. If that 11-digit number is preceded by the string <facsimile> or <fax>, then it is classified as a facsimile number and the mobile device is provisioned for that task if the user indicates a desire to use it.

Figure 2B:
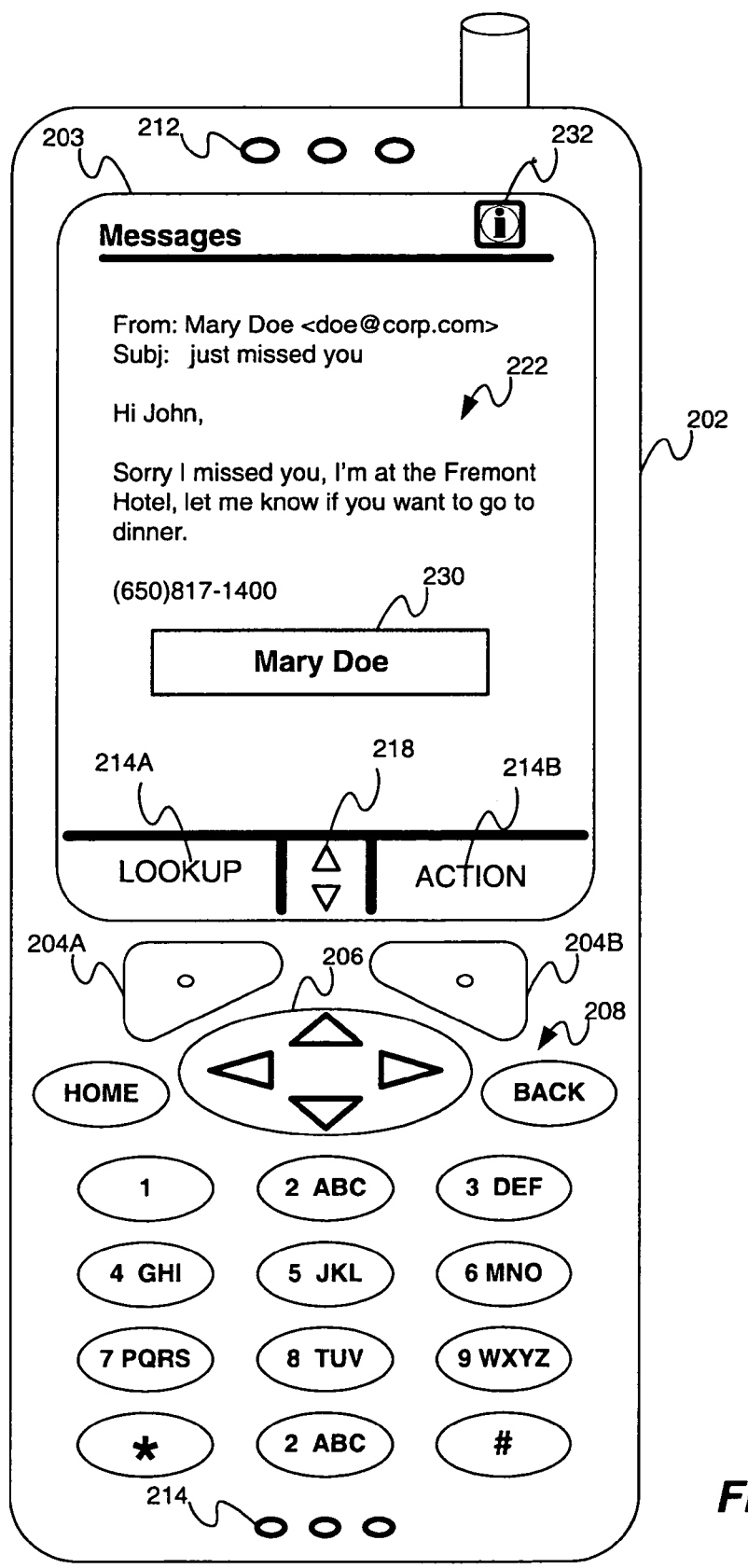
Figure 2C:
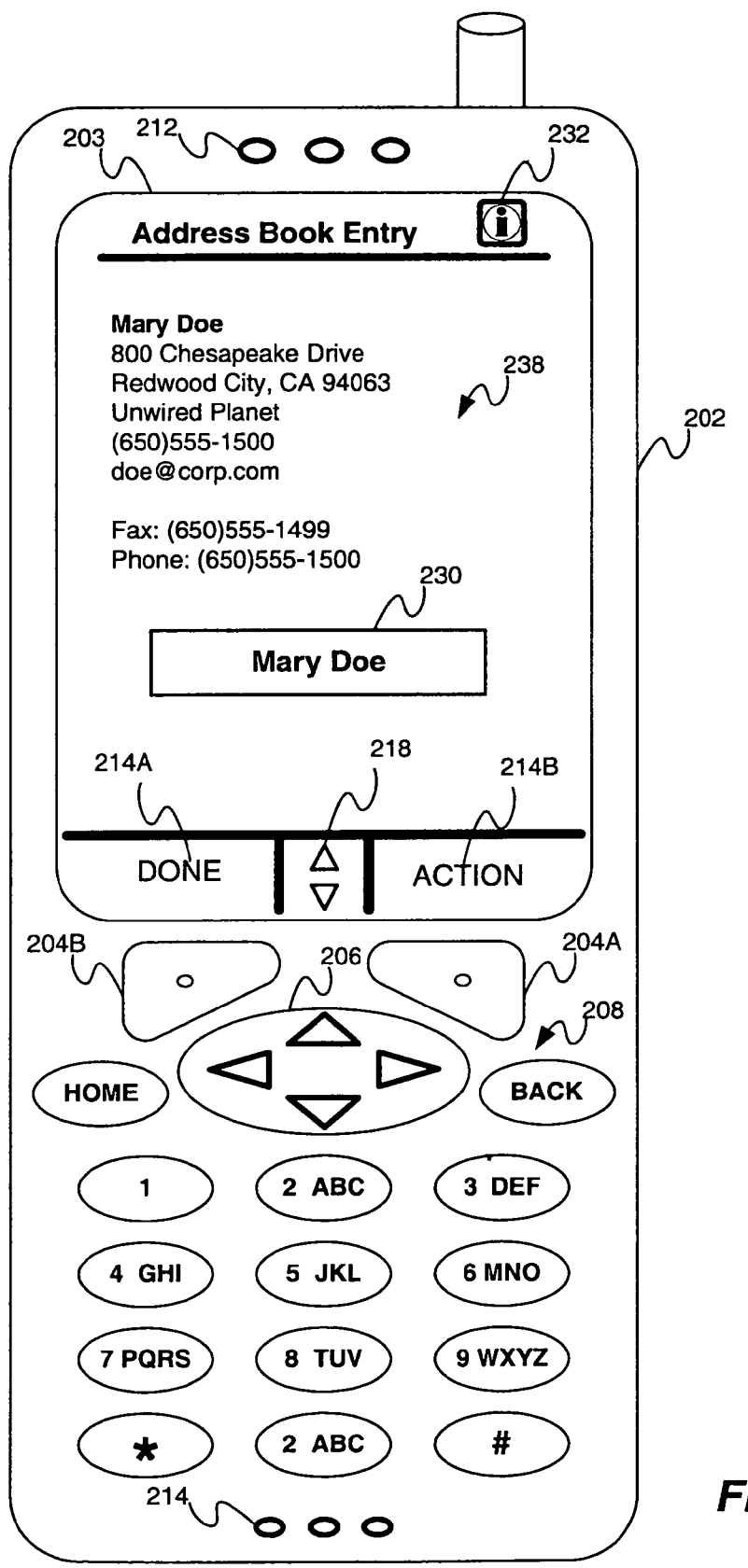

Referring now to FIG. 2B, notice that the string <Mary Doe> has been selected and is presented in large font with a frame at the bottom of the display screen 203. It is important to note at this point that the present invention may be practiced with or without highlighting the encountered contact identifiers. The highlighting in this example is used for purposes of illustration and not limitation. Encountered strings may be presented to the user of mobile device 202 for possible use in any format supported by display screen 203. The string <Mary Doe> follows the string <From:> that provides an indication that the following string may be a name. The string <Mary Doe>, once identified and selected for possible use, may be utilized to retrieve records containing that string. The records retrieved may be stored in internal storage on mobile device 202 or on a remote server device (e.g. gateway server 106 or network server 120 of FIG. 1). For example, the string could be used to look for a related address book entry.

One of ordinary skill in the art would understand that there are numerous other methods that may be utilized to identify names and identifiers of local interest. For example, a local rule that states that strings having two or more consecutive groupings of characters (e.g. words) beginning with uppercase letters should be classified as names. This rule would cause the strings <Mary Doe> and <Fremont Hotel> to be selected. As another example, names listed in an accessible address book, contact list or calendar could be used to test for the presence of contact identifiers of interest. Local rules of this type can be selected and managed by the user of mobile device 202 with the assistance of user preference menus and lists.

Referring again to FIG. 2B, symbolic indicator 232 provides an indication that one or more information resources are available containing the string <Mary Doe>. As mentioned, the information resource(s) can be stored in the mobile device itself, such as an address book data base incorporated into the mobile device, or can be stored in, for example, a database file in the network server 120 (FIG. 1). In the case of a database file stored by an entity separate from the mobile device, the database file can be a file which is accessible only to the user of the mobile device (e.g. accessible by providing a unique identifying code from the mobile device), or the database file can be one available to public access such as a public commercial database (e.g. telephone directory "white pages" or "yellow pages" database). By activating a predetermined key (e.g. softkey 204B) the available resource is retrieved, as displayed at 238 in FIG. 2C. In this example the available resource is an address book entry for Mary Doe. Note that in accordance with the invention that contact identifier analysis may also be performed on the retrieved resource using the same process described above.

Figure 2D:
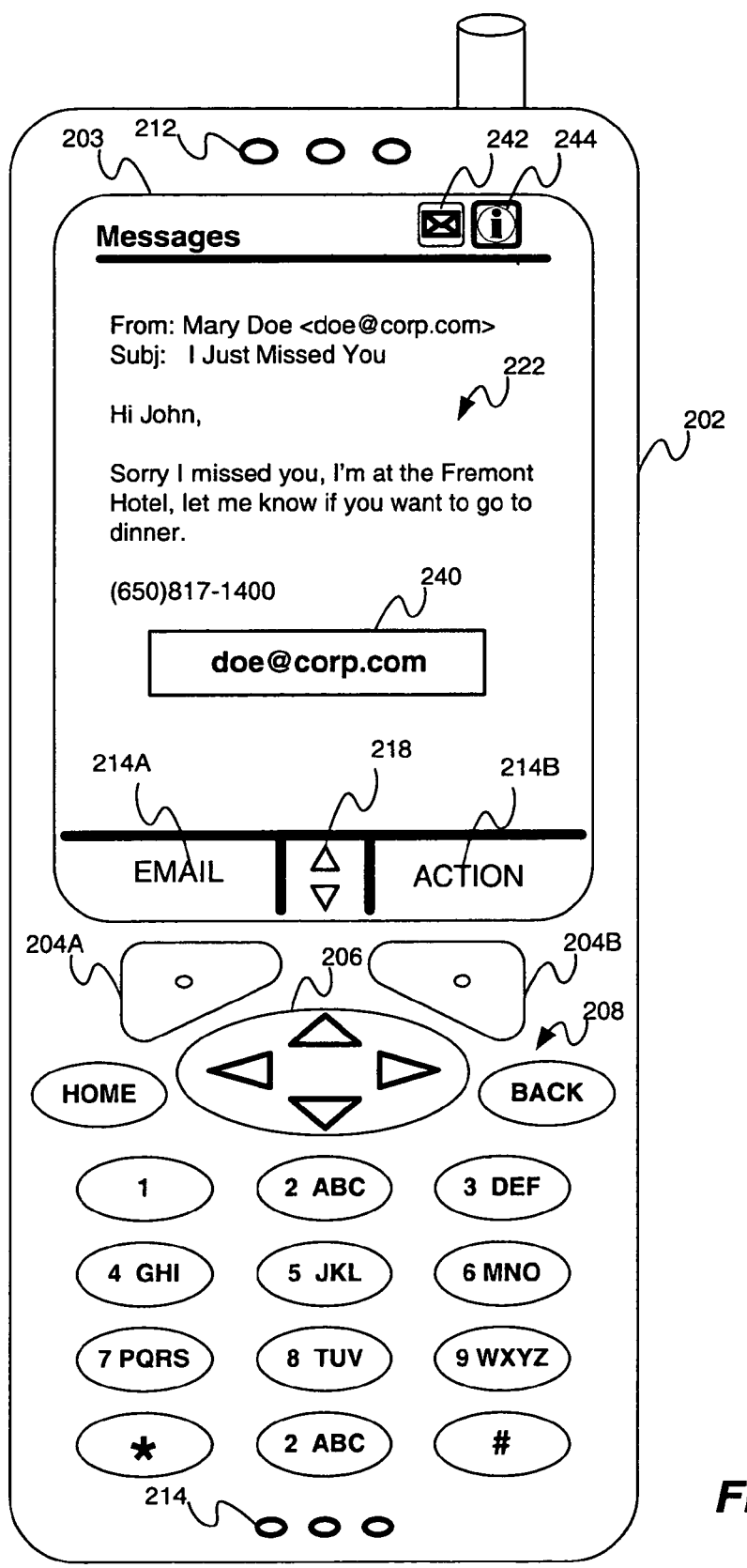
Figure 2E:
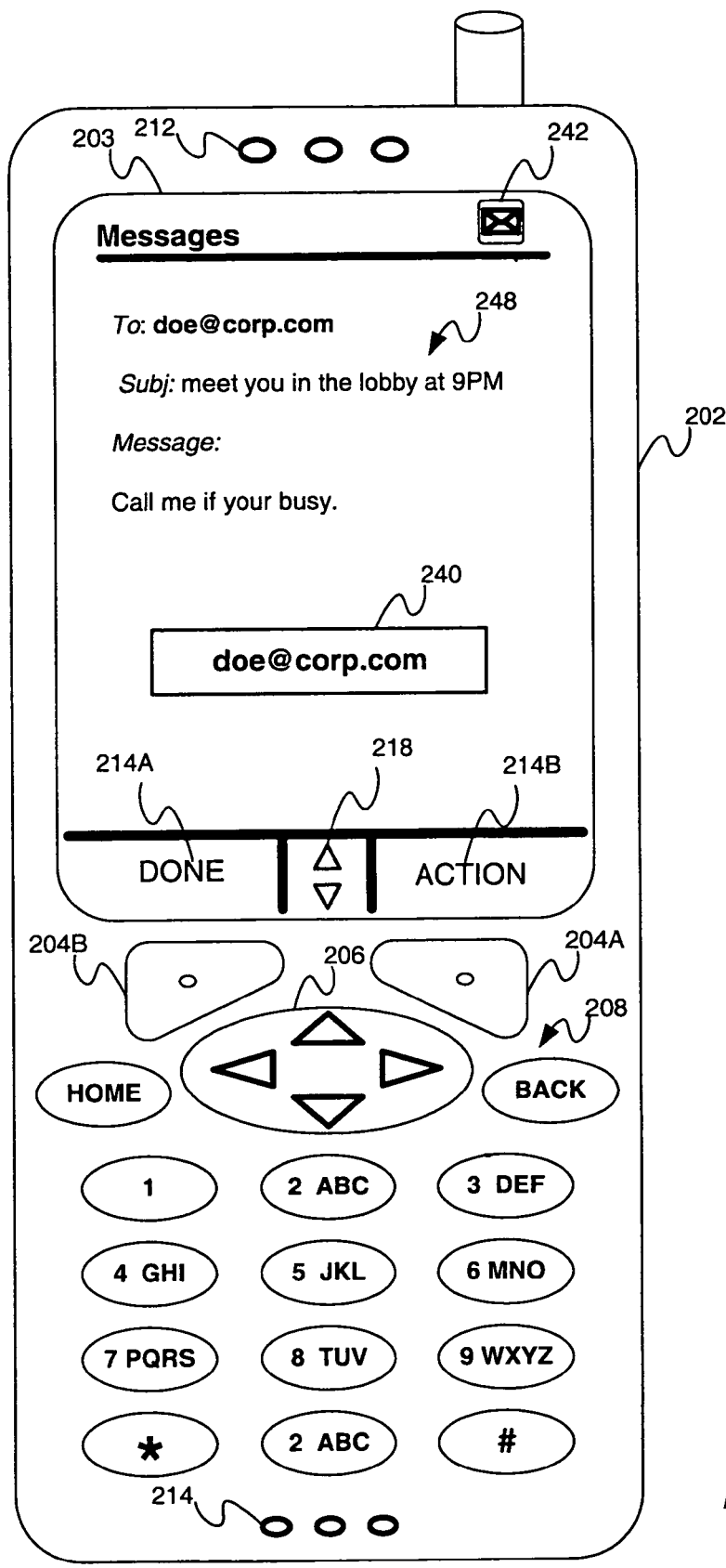

Referring now to FIG. 2D, the string <doe@corp.com> has been identified and highlighted (240) in the bottom of screen display 203. Indicator 242 provides an indication that <doe@corp.com> has been classified as an email contact identifier and may be used to send an email message by activating softkey 204A. Softkey identifier message 214A indicates that the associated softkey 204A has been assigned the function of email initiation. More specifically, activation of softkey 204A causes an email application to be initialized by the mobile device and the email contact identifier to be automatically inserted in the <To:> field of the email message 248 as is illustrated in FIG. 2E. The format abc@dot.com is generally found in email addresses and may be used to select email contact identifiers. Symbolic indicator 244 (FIG. 2D) provides an indication that there is also a corresponding information resource. In this example, the resource is the address book entry referred to hereinabove and displayed in FIG. 2C. Activating softkey 204B may retrieve the information resource.

Figure 2F:
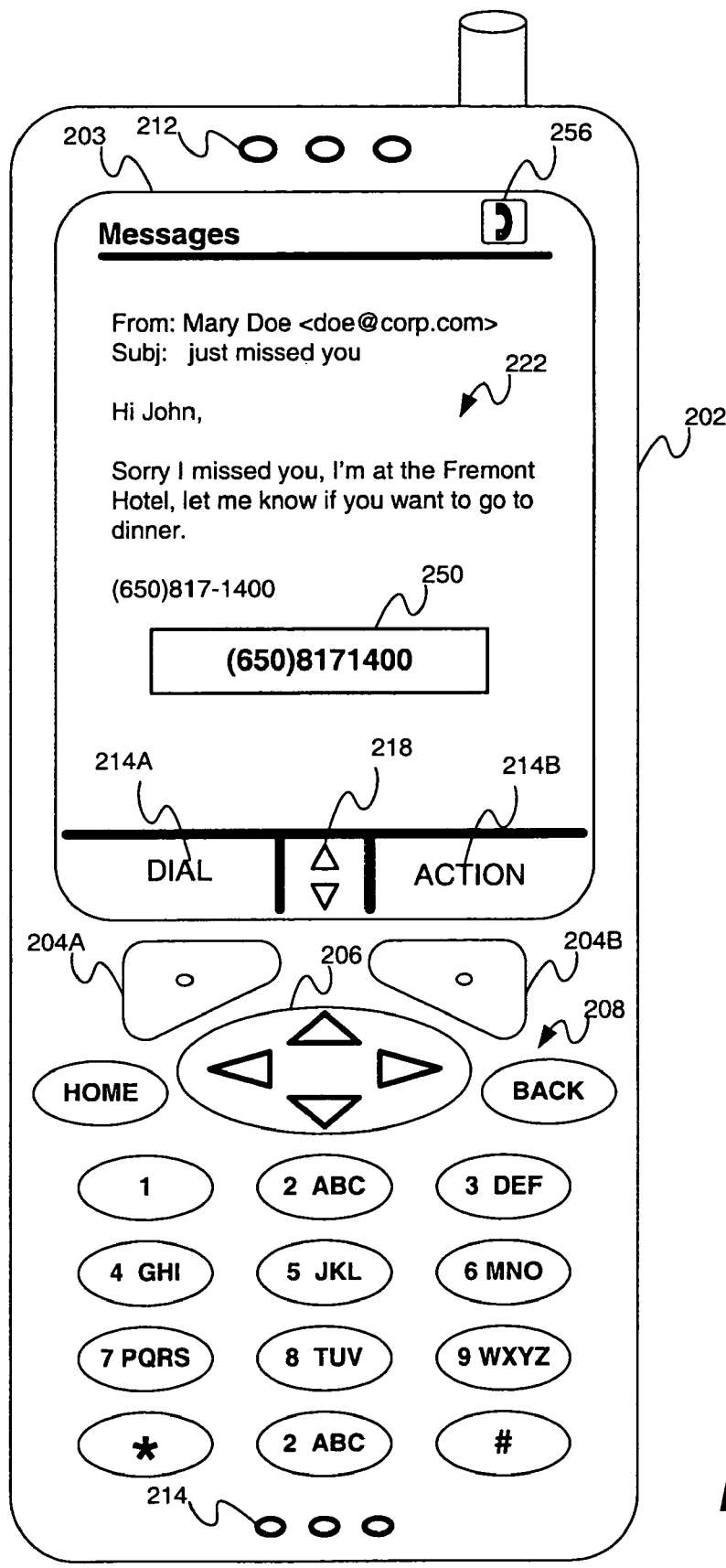

Referring now to FIG. 2F, the string <(650) 817-1400> has been identified and highlighted (250) in the bottom of screen display 203. Symbolic indicator 256 provides an indication that <(650) 817-1400> is a phone number identifier and may be used to place a phone call by activating softkey 204A. The softkey identifier 214A indicates that the associated softkey 204A has been assigned the function of initiating dialing. As previously stated, the present invention may be practiced with or without the highlighting of encountered contact identifiers.

According to the principles of the present invention, content stored on or being processed by a mobile device (e.g. mobile device 202 of FIGS. 2A–2F) may be automatically analyzed for the presence of pre-determined class specific contact identifiers (e.g. phone numbers, email addresses or URIs) and/or user specified contact identifiers (e.g. address book entries or proper nouns). Encountered identifiers meeting the specified criteria are brought to the attention of a user of the mobile device. The user of the mobile device may utilize the encountered identifiers to perform tasks (e.g. place phone calls or send email messages) associated with their classification or to perform user specified tasks (e.g. retrieve a record or establish a record). The analysis described above may be applied to the headers and content of a particular message or file. The processing of the message or file components (i.e. character strings) may be performed sequentially or optimized for processing speed.

Figure 2G:
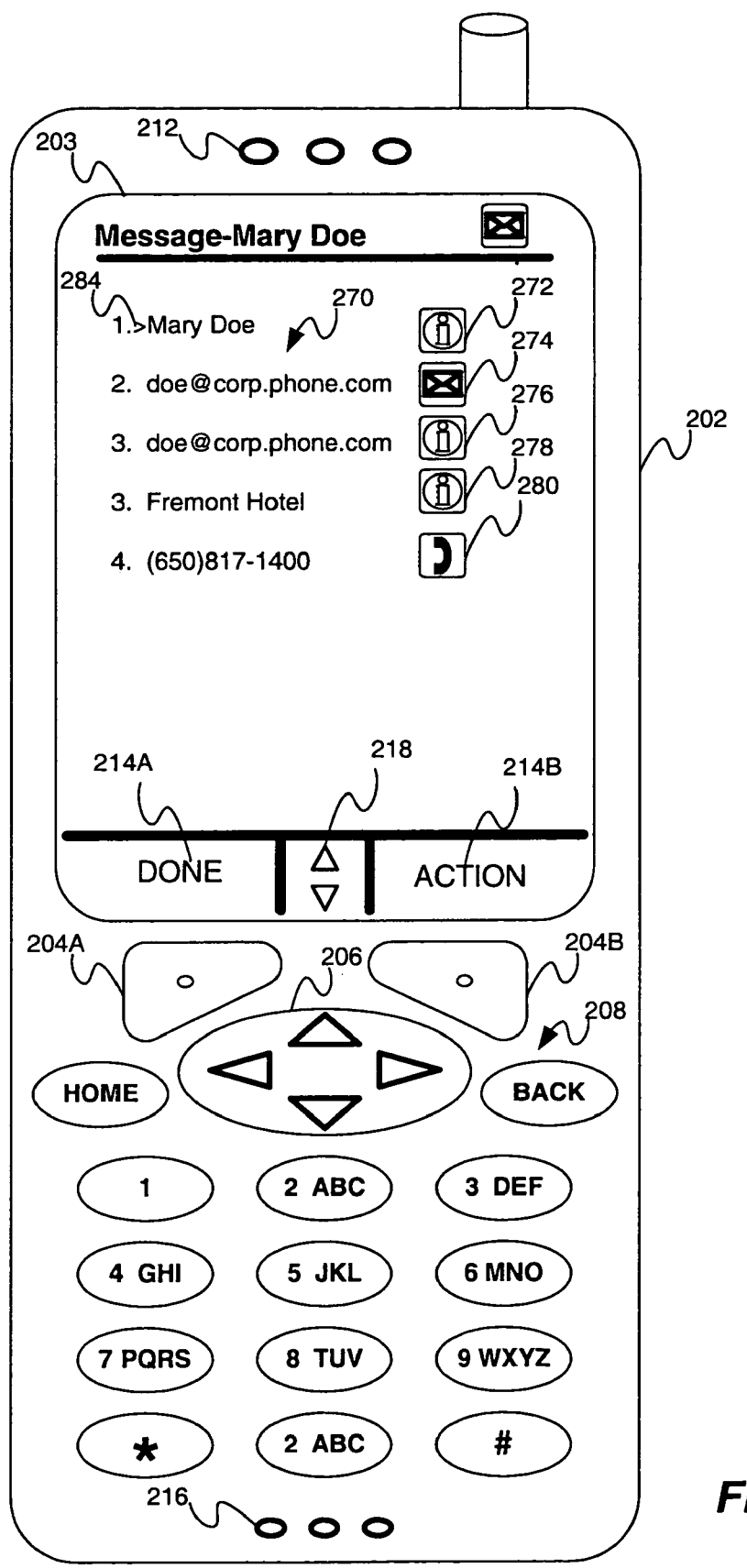

It is important to note that any method of bringing encountered contact identifiers to the attention of the user of the subject mobile device may be utilized without deviating from the principles of the present invention. For example, as is illustrated in FIG. 2G, the user may be presented on the display screen 203 with a list 270 of contact identifiers present within a message of interest. Additionally, symbolic identifiers (e.g., icons) 272, 274, 276, 278, and 280 may be presented in association with encountered contact identifiers present within the message to provide additional information. If the user of the subject mobile device desires to utilize a contact identifier on the list to establish a communications session then the element selection indicator 284 is positioned adjacent to the contact identifier of interest (e.g. Selection 1 "Mary Doe") using the navigation rocker 206 and a predetermined key is activated.

Figure 3:
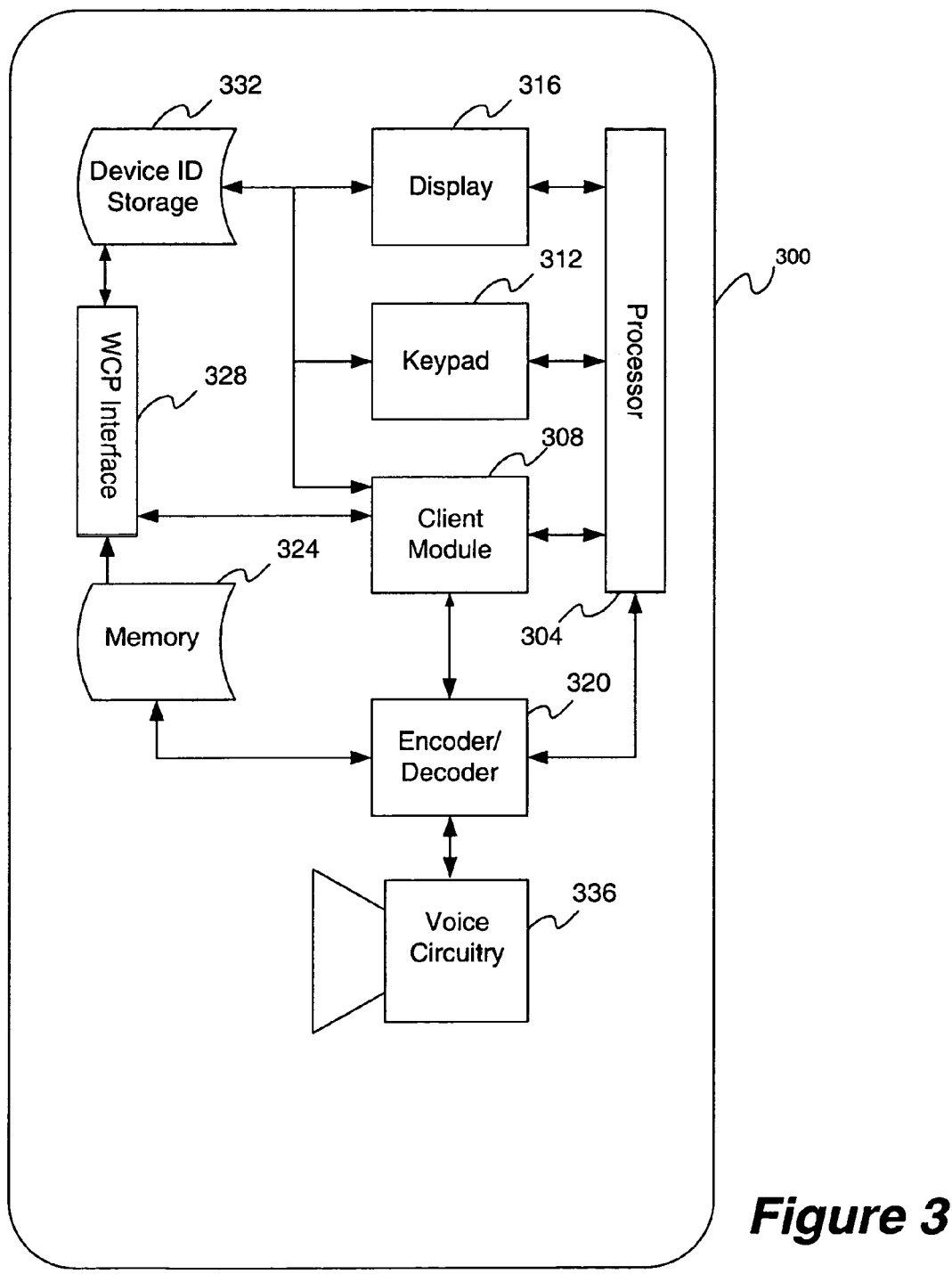
FIG. 3 is a block diagram of a mobile device that may be used in conjunction with the wireless communication system described in FIG. 1 to implement the method of the present invention.

FIG. 3 is a block diagram of the primary functional components of a mobile device 300, which may be utilized in conjunction with the practice of the present invention. Mobile device 300 includes a Wireless Control Protocol (WCP) interface 328 that couples to a wireless network (e.g. 104 of FIG. 1) via a radio frequency (RF) transceiver (not shown) to receive incoming and outgoing signals. A device identifier (ID) storage 332 supplies a device ID via WCP interface 328.

The device ID identifies a specific code that is associated with mobile device 300. The device ID is used by a gateway server device (e.g. gateway server device 106 of FIG. 1) to associate the mobile device 300 with a user account typically resident in the gateway server device. The device ID can be a phone number of the device or a combination of an IP address and a port number. An example of a combination of an IP address and a port number is 204.163.165.132: 01905 where 204.163.165.132 is the IP address and 01905 is the port number. The device ID is further associated with a subscriber ID authorized by a wireless carrier network as part of the procedures to activate a subscriber account for the mobile device 300. The subscriber ID may take the form of, for example, 861234567-10900_pn.mobile.att.net by AT&T Wireless Service. It is a unique identification for mobile device 300. Each of the mobile devices serviced by a gateway server device (e.g. gateway server device 106 of FIG. 1) has a unique device ID that is associated with a respective user account. These unique device IDs may be associated with network applications (e.g. address books) and user specific storage areas on the gateway server device.

Mobile device 300 also includes voice circuitry 336 (e.g., a speaker and a microphone), an encoder/decoder 320, a processor 304, a memory device 324, keypad circuitry 312, and display circuitry 316. These components and the previously described components allow mobile device 300 to function in a telephone mode of operation and a data mode of operation when used in conjunction with a gateway server device. In the telephone mode of operation, a user can cause mobile device 300 to place a phone call to another party having a phone, either wireless or land-based.

In addition, mobile device 300 includes a client module 308, which works in conjunction with processor 304 and the memory 324 to perform processing tasks required for the operation of mobile device 300. These include: establishing a communication session with a gateway server device via a wireless network, requesting and receiving data via the wireless network, displaying information on the mobile device display screen through the use of display circuitry 316, and receiving user input from a user via a keypad controlled by keypad circuit 312. Additionally, client module 308 contains computer code to cause processor 304 to execute instructions for controlling the operation of, among other things, a browser. In one embodiment, the browser is a micro-browser, which typically requires less computing power and memory than the HTML browsers used in personal computer. One such micro-browser is available from Phone.com located at 800 Chesapeake Drive, Redwood City, Calif. 94063, the assignee of the present invention.

The micro-browser may also include computer code, for performing functions relating to services other than browsing. Examples of such services include, email, facsimile, SMS, remote personal file services (e.g. a network address book) and paging. One of ordinary skill in the art would understand that program code associated with these services may be incorporated in the micro-browser application, exist as independent applications or be incorporated in some other application resident on the mobile device. Encountered contact identifiers may be utilized to initialize one or more of these service applications and to automatically fill pre-determined fields within initialized applications. This reduces the amount of input required from the user thereby making it easier to perform a given task and assist in overcoming some of the inherent limitations of the interfaces of such devices.

Figure 4:
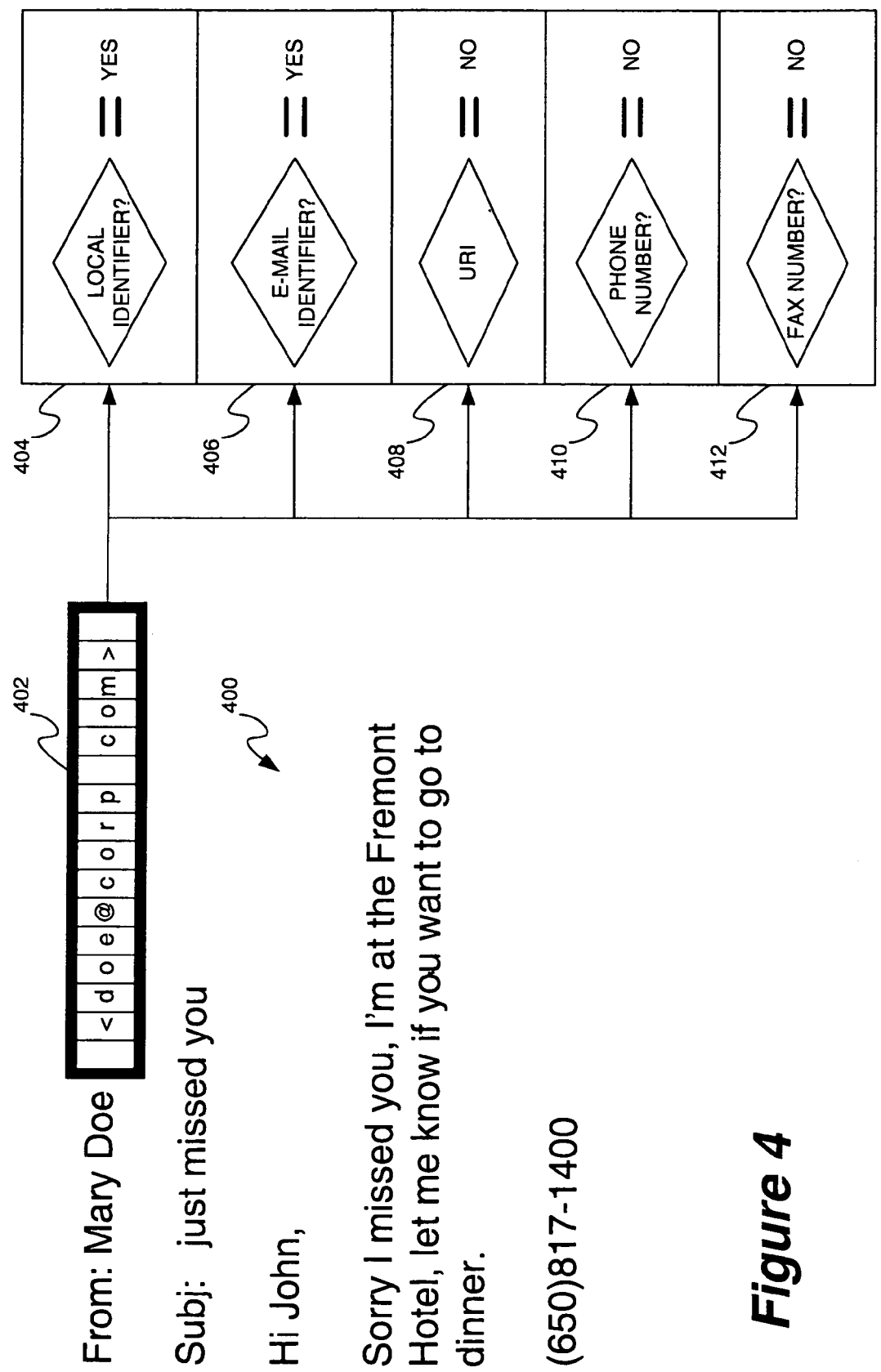
FIG. 4 illustrates the contact selection and classification process which may be used when implementing the method of the present invention.

FIG. 4 illustrates a contact identifier analysis process in accordance with the practice of an embodiment of the present invention. A message 400, which is stored on or being processed by a mobile device (i.e. mobile device 102 of FIG. 1), is analyzed for the presence of contact identifiers meeting predetermined criteria. The contents of message 400 (shown in the left side of FIG. 4) may be comprised of a plurality of distinguishable string entities containing alphanumeric and symbolic elements. Examples include grouping of numbers having a certain number of elements (e.g. (650) 817-1400), an alphanumeric string including a particular symbol (e.g. @ in doe@corp.com), a string having a particular format (e.g. <.com> without @), an alphanumeric sequence having a particular arrangement of upper and lower case letters (e.g. Mary Doe), an alpha numeric string following a particular string sequence (e.g. <From:>, <Facsimile:>, <Fax:> etc.) and others.

The string entities are automatically selected by a program-controlled process and compared to predetermined string templates and user specified string entities (e.g. entries in an address book). This automatic selection process may be used to sequentially process the string entities in message 400 and any associated headers. The entity <doe@corp.com> 402 is an example of a string entity that has been selected for analysis in message 400. In this example, the string entity <doe@corp.com> 402 is compared to the entries in a user specified file (e.g. an address book) at 404 and a match is found (i.e. Local Identifier=Yes). Some indication of this match (e.g. indicator 232 of FIG. 2B) may be provided to the user of the mobile device and the string entity may be used to retrieve the source file containing the matching string. For an example, if there is an address book record that includes the subject contact identifier then that record may be retrieved.

At 406 the string entity <doe@corp.com> 402 is compared to a template for email contact identifiers. String entity 402 has the basic format for an email contact identifier (i.e. it contains @ and .com) so a match is registered. As was the case before, some indication of this match may be provided to the user (e.g. indicator 210 of FIG. 2A) and entity 402 may be used to initialize an email application and pre-fill selected fields.

At 408, 410, and 412 string entity <doe@corp.com> 402 is compared to three other contact identifier types (i.e. URI, phone number and facsimile number). No other matches are found for string entity <doe@corp.com> 402 and the process automatically proceeds to the next string entity. In this example, the string entities contained in message 400 and any associated headers are processed sequentially. One of ordinary skill in the art would understand that processing methodologies other than sequential processing may be utilized without deviating from the principles of the present invention. For example, the analysis could be limited to a particular portion of a message entity (e.g. the body of a message entity) or performed only on strings exceeding a pre-determined number of characters.

In general, e-mail addresses, for example, have a well-defined format, such as: <name>@<something>.(com|net|org|gov). This makes it relatively easy to identify an e-mail address in a generalized text message. Likewise, a web link or URL has an unambiguous format (possibly preceded by "http://") <something>.(com|net|org|gov). In addition to identification using these known formats, a searching procedure can use a simple heuristic to look for a string following phrases like "e-mail me at", "mail me at", "my e-mail address is", "you can reach me at", "the site is", "the link", or the like.

In contrast, phone numbers can be represented a number of different ways. They may range from only a few digits ("x1234") to many (011-61-418-333-444). A reasonably strong rule for identifying phone numbers is to look for from 4 to 20 digits interspersed with common punctuation marks, such as "( )", "[ ]", ".", "-", or spaces. As above, the searching can be aided through the identification of common lead-in phrases such as "call me at", "my number is", "Home", "Work", "Ext.", and the like. Note that a partial number like "ext. 1459" can be expanded into a full telephone number by matching it in the local phone number list or address book.

A given message may contain many potential e-mail addresses, URLs or phone numbers. In some cases, therefore, it can be advantageous for the searching procedure to scan the entire message and, instead of stopping at the first potential string, find all candidates and assign each a "quality" factor according to the form of the string or the metric used to identify it. Then, the string judged as most likely being a valid contact identifier can be presented to the user first. Thus, a message that contained "1234", followed by "www.yahoo.com" would rank the URL higher than the partial phone number and present it first.

Figure 5:
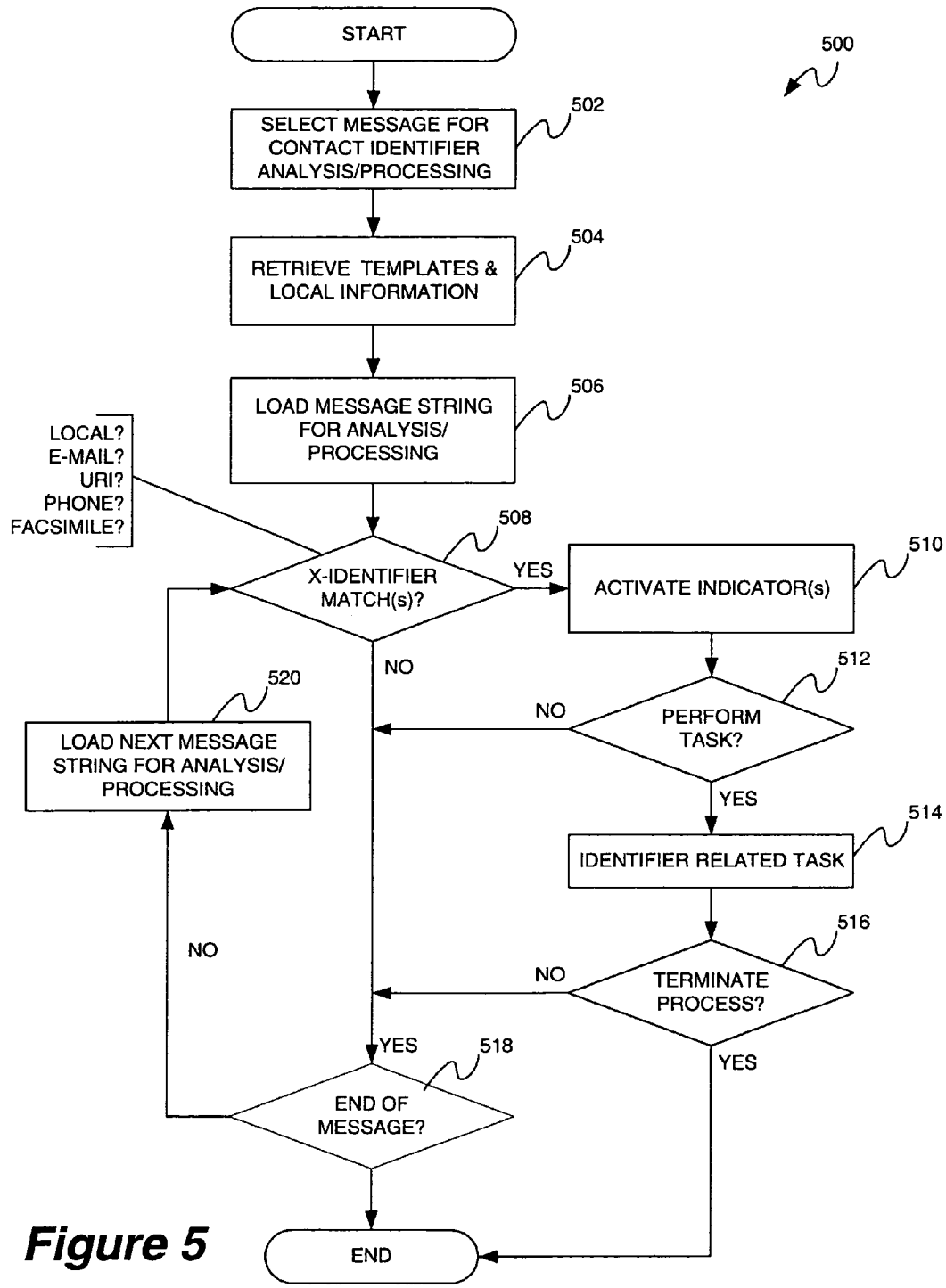
FIG. 5 is a flow diagram which illustrates the steps associated with the operations of contact information classification, selection and utilization, as used when practicing the present invention.

FIG. 5 is a flow diagram of a string entity processing operation 500 according to one embodiment of the present invention. The string entity processing operation 500 is, for example, performed on a mobile device, such as the mobile device 102 illustrated in FIG. 1.

String entity processing operation 500 is initiated by user interaction via the user interface of the mobile device (e.g. mobile device 102 of FIG. 1). At 502 a user of the mobile device selects a message for contact identifier analysis/processing. As previously stated, the selected message being processed may or may not be displayed on the display screen of the subject mobile device. For example, the selected message may be a designated message stored in the subject mobile device. In the case where the message is stored on the mobile device, the message may be selected for analysis/processing by selecting an identifier associated with the message.

Once a message is selected for processing/analysis, contact identifier templates and local information (e.g. user-specified information and rules such as the location identifiers (e.g. storage locations or identifiers) for files containing comparison strings and local rules for string entity classification) are loaded (504). At 506 message strings are automatically loaded for processing/analysis. As previously stated, string entities may be processed sequentially, but this is not a requirement for the practice of the present invention.

At 508 the string entity loaded at 506 is compared to the loaded templates and local information and a determination is made as to whether the loaded string can be classified as belonging to one or more of the predetermined contact identifier categories (e.g. local contact, email, URI, phone number, or facsimile number). If a match is found at 508 then a command is generated at 510, which may cause information relating to the encountered contact identifier to be displayed on the display screen of the mobile device. This information may provide information relating to the type of contact identifier encountered or to the type of information that may be retrieved using the encountered contact identifier. At 512 a determination is made as to whether the user desires to perform some task with the encountered contact identifier. For example, if the encountered contact identifier is classified as an email address, then it may be utilized to initialize a local email program and pre-fill certain fields in the email message. User selections for tasks to be performed are processed at 514. Upon completion of the selected task at 514, the user is given the opportunity to terminate string entity processing operation 500 at 516.

If a match is not found at 508, then a determination is made at 518 as to whether the end of the message has been reached. If the end of the message is reached then the string entity processing operation 500 is terminated. If the end of the message has not been reached at 518, then the next string entity is loaded (520) and is processed beginning at 508.

According to the principles of the present invention, the user of a mobile device may designate a file for contact identifier analysis/processing. The designated file may be displayed on (or being processed by) the subject mobile device or it may be stored on the subject mobile device. Encountered contact identifiers matching predetermined criteria found in the designated file are brought to the attention of the user via some mechanism (e.g. a list of encountered contact identifiers as displayed in FIG. 2G). Additionally, symbolic indicators may be displayed which provide additional information relating to the function of the encountered contact identifiers. The encountered contact identifiers may be utilized to perform some task relating to their classification (e.g. send an email message) and/or they may be utilized to perform a user specified task (retrieve a record containing an encountered contact identifier).

The invention can take the form of a computer readable code on a computer readable medium. The computer readable medium is any data storage device that can store data, which can thereafter, be read by a computer system. Examples of a computer readable medium include read-only memory, random-access memory, CD-ROMs, magnetic tape, optical data storage devices, and carrier waves.

In a preferred embodiment, the computer readable code is available for download on a server system such that authorized client systems may couple to the server system to retrieve the computer readable code across a computer network. In this manner, the computer readable code may be distributed over the network to the client computer system. For example, a plurality of wireless client devices such as cell phone 102 in FIG. 1 may download the same copy of software from a single server system such as server 120 using the available network 104.

The advantages of the invention are numerous. Different embodiments or implementations may yield one or more of the following advantages. One advantage of the invention is that users can be alerted to the presence of contact identifiers belonging to predetermined classes. Another advantage of the invention is that users are able to utilize encountered contact identifiers to perform class specific or user-specified tasks. Still another potential advantage of the invention is that the user interaction with the user interface may be made more efficient. Yet another advantage of the invention is that users may retrieve remotely held resources containing encountered contact identifiers.

It will be apparent from the foregoing description that many of the functions of the described embodiments of the invention can be implemented by the use of instruction codes for controlling a processing device in a mobile wireless communications device. Having described in detail the principles, applications and operation of the invention, it is within the scope of those of ordinary skill in the art to perform the invention by providing instruction codes to implement the inventive functions to operate on existing or specifically designed mobile devices. It will be appreciated, of course, that the instruction codes for implementing the invention will vary depending upon the mobile device and the processing device therein upon which the instruction codes are to operate.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be considered to fall within the scope of the invention.

We claim:

1. A method of operating a wireless communication device, the method comprising:
   receiving a message at the wireless communication device;
   automatically detecting a contact identifier in the message;
   automatically identifying a class of contact identifier to which the contact identifier belongs, from a plurality of predetermined classes of contact identifiers;
   outputting descriptive information relating to the contact identifier on an output component of the wireless communication device; and
   enabling a user of the wireless communication device to initiate a task relating to the contact identifier in response to said descriptive information being output, including automatically provisioning a user interface of the wireless communication device, based on the identified class of contact identifier, to allow initiation of the task, including determining information to be output by the output component based on the identified class of contact identifier, such that the user interface is configured in a first configuration if the contact identifier belongs to a first class of the plurality of predetermined classes of contact identifiers, and such that the user interface is configured in a second configuration if the contact identifier belongs to a second class of the plurality of predetermined classes of contact identifiers.

2. A method of operating a wireless communication device, the method comprising performing the method recited in claim 1 for each of a plurality of contact identifiers in the message.

3. A method as recited in claim 1, wherein each of the plurality of predetermined classes of contact identifiers represents a different mode of communication.

4. A method as recited in claim 3, wherein the mode of communication of each contact identifier is from the group consisting of electronic mail services, facsimile services, short message services, paging services, file retrieval services and phone services.

5. A method as recited in claim 1, wherein the task comprises sending a response to the message to a destination specified by the contact identifier.

6. A method as recited in claim 1, wherein the task comprises retrieving a contact record containing the contact identifier.

7. A method as recited in claim 1, wherein the task relating to the contact identifier establishes a communication session with a remote gateway.

8. A method as recited in claim 1, wherein the task relating to the contact identifier automatically inserts an identified contact identifier into a field of a database record.

9. A method as recited in claim 1, further comprising:
   identifying a resource containing the contact identifier; and
   retrieving the identified resource.

10. A method as recited in claim 1, further comprising performing said receiving, said detecting, said identifying, said outputting, and said enabling, for at least one additional contact identifier in the received message.

11. A method as recited in claim 1, wherein the contact identifier is a field entry in a stored file.

12. A method as recited in claim 11, wherein the stored file is from the group consisting of an address book, a calendar and a contact list.

13. A method as recited in claim 11, wherein the stored file is a database stored on a remote server device.

14. A method as recited in claim 13, wherein the database stored on the remote server device is a public commercial database.

15. A method as recited in claim 1, wherein the plurality of predetermined classes is from the group consisting of electronic mail contact identifiers, Uniform Resource Indicators (URIs), phone number contact identifiers, facsimile number contact identifiers, pager number contact identifiers, short message service contact identifiers, and user specified contact identifiers.

16. A method as recited in claim 1, wherein the wireless communication device is from the group consisting of a mobile phone, a personal digital assistant and a two-way pager.

17. A method of operating a wireless communication device, the method comprising:
   receiving a message at the wireless communication device;
   automatically detecting a plurality of contact identifies in the message; and
   for each of the plurality of contact identifiers in the message,
   automatically identifying a class of contact identifier to which the contact identifier belongs, from a plurality of predetermined classes of contact identifiers,
   outputting descriptive information relating to the contact identifier on an output component of the wireless communication device, and
   enabling a user of the wireless communication device to initiate a task relating to the contact identifier in response to said outputting descriptive information relating to the contact identifier, wherein said enabling includes automatically provisioning a user interface of the wireless communication device, based on the identified class of contact identifier, to allow initiation of the task, including determining information to be output by the output component based on the identified class of contact identifier, such that the user interface is configured in a first configuration if the contact identifier belongs to a first class of the plurality of predetermined classes of contact identifiers, and such that the user interface is configured in a second configuration if the contact identifier belongs to a second class of the plurality of predetermined classes of contact identifiers.

18. A method as recited in claim 17, wherein each of the plurality of predetermined classes of contact identifiers represents a different mode of communication.

19. A method as recited in claim 18, wherein the mode of communication of each contact identifier is from the group consisting of electronic mail services, facsimile services, short message services, paging services, file retrieval services and phone services.

20. A method as recited in claim 17, wherein the task comprises sending a response to the message to a destination specified by the contact identifier.

21. A method as recited in claim 17, wherein the task comprises retrieving a contact record containing the contact identifier.

22. A method as recited in claim 17, wherein the task relating to the contact identifier establishes a communication session with a remote gateway.

23. A method as recited in claim 17, wherein the task relating to the contact identifier automatically inserts an identified contact identifier into a field of a database record.

24. A method as recited in claim 17, further comprising:
   identifying a resource containing the contact identifier; and
   retrieving the identified resource.

25. A method as recited in claim 17, wherein the contact identifier is a field entry in a stored file.

26. A method as recited in claim 25, wherein the stored file is from the group consisting of an address book, a calendar and a contact list.

27. A method as recited in claim 25, wherein the stored file is a database stored on a remote server device.

28. A method as recited in claim 27, wherein the database stored on the remote server device is a public commercial database.

29. A method as recited in claim 17, wherein the plurality of predetermined classes is from the group consisting of electronic mail contact identifiers, Uniform Resource Indicators (URIs), phone number contact identifiers, facsimile number contact identifiers, pager number contact identifiers, short message service contact identifiers, and user specified contact identifiers.

30. A method as recited in claim 17, wherein the wireless communication device is from the group consisting of a mobile phone, a personal digital assistant and a two-way pager.

31. A method of operating a wireless communication device, the method comprising:
   receiving a message at the wireless communication device;
   automatically detecting a contact identifier in the message;
   automatically identifying a class of contact identifier to which the contact identifier belongs, from a plurality of predetermined classes of contact identifiers, wherein each of the plurality of predetermined classes of contact identifiers represents a different mode of communication;
   outputting descriptive information relating to the contact identifier on an output component of the wireless communication device; and
   enabling a user of the wireless communication device to initiate a task relating to the contact identifier, in response to said outputting descriptive information relating to the contact identifier, wherein said enabling includes automatically provisioning a user interface of the wireless communication device, based on the identified class of contact identifier, to allow initiation of the task, including determining information to be output by the output component based on the identified class of contact identifier, such that the user interface is configured in a first configuration if the contact identifier belongs to a first class of the plurality of predetermined classes of contact identifiers, and such that the user interface is configured in a second configuration if the contact identifier belongs to a second class of the plurality of predetermined classes of contact identifiers.

32. A method as recited in claim 31, the method comprising performing said detecting, said identifying, and said outputting for each of a plurality of contact identifiers in the message.

33. A method as recited in claim 31, wherein the mode of communication of each contact identifier is from the group consisting of electronic mail services, facsimile services, short message services, paging services, file retrieval services and phone services.

34. A method as recited in claim 31, wherein the task comprises sending a response to the message to a destination specified by the contact identifier.

35. A method as recited in claim 31, wherein the task comprises retrieving a contact record containing the contact identifier.

36. A method as recited in claim 31, wherein the task relating to the contact identifier establishes a communication session with a remote gateway.

37. A method as recited in claim 31, wherein the task relating to the contact identifier automatically inserts an identified contact identifier into a field of a database record.

38. A method as recited in claim 31, further comprising:
identifying a resource containing the contact identifier; and
retrieving the identified resource.

39. A method as recited in claim 31, wherein the contact identifier is a field entry in a stored file.

40. A method as recited in claim 31, wherein the stored file is from the group consisting of an address book, a calendar and a contact list.

41. A method as recited in claim 31, wherein the stored file is a database stored on a remote server device.

42. A method as recited in claim 41, wherein the database stored on the remote server device is a public commercial database.

43. A method as recited in claim 31, wherein the plurality of predetermined classes is from the group consisting of electronic mail contact identifiers, Uniform Resource Indicators (URIs), phone number contact identifiers, facsimile number contact identifiers, pager number contact identifiers, short message service contact identifiers, and user specified contact identifiers.

44. A method as recited in claim 31, wherein the wireless communication device is from the group consisting of a mobile phone, a personal digital assistant and a two-way pager.

* * * * *